US012639380B2

(12) United States Patent
Miguel et al.

(10) Patent No.: US 12,639,380 B2
(45) Date of Patent: May 26, 2026

(54) WORK INCOME VISUALIZATION AND OPTIMIZATION PLATFORM

(71) Applicant: Steady Platform LLC, Atlanta, GA (US)

(72) Inventors: Amanda Miguel, Atlanta, GA (US); Winn Martin, Atlanta, GA (US); Jeff Chelko, Atlanta, GA (US); Marcel Crudele, Atlanta, GA (US); Jasmine Hentschel, Atlanta, GA (US); Antonea Nabors, Atlanta, GA (US); Kabir Shukla, Atlanta, GA (US); Tyler Howard, Atlanta, GA (US)

(73) Assignee: STEADY PLATFORM, INC., Atlanta, GA (US)

( * ) Notice: Subject to any disclaimer, the term of this patent is extended or adjusted under 35 U.S.C. 154(b) by 0 days.

(21) Appl. No.: 17/506,722

(22) Filed: Oct. 21, 2021

(65) Prior Publication Data

US 2022/0043872 A1 Feb. 10, 2022

Related U.S. Application Data

(63) Continuation of application No. 17/161,747, filed on Jan. 29, 2021.

(60) Provisional application No. 62/968,187, filed on Jan. 31, 2020.

(51) Int. Cl.
| | |
|---|---|
| *G06F 16/00* | (2019.01) |
| *G06F 16/9535* | (2019.01) |
| *G06F 16/9538* | (2019.01) |
| *G06N 20/00* | (2019.01) |
| *G06Q 10/0631* | (2023.01) |
| *G06Q 40/12* | (2023.01) |

(52) U.S. Cl.
CPC ...... *G06F 16/9535* (2019.01); *G06F 16/9538* (2019.01); *G06N 20/00* (2019.01); *G06Q 10/063116* (2013.01); *G06Q 40/12* (2013.12)

(58) Field of Classification Search
CPC . G06F 16/9535; G06F 16/9538; G06N 20/00; G06N 20/20; G06Q 10/063116; G06Q 40/12
USPC .................................................. 707/600–899
See application file for complete search history.

(56) References Cited

U.S. PATENT DOCUMENTS

| | | | | |
|---|---|---|---|---|
| 10,460,391 | B2 | 10/2019 | Caldwell | |
| 10,510,113 | B2 | 12/2019 | Caldwell | |
| 10,984,468 | B1 * | 4/2021 | Hockey | .................. G06Q 40/02 |
| 2015/0127565 | A1 * | 5/2015 | Chevalier | .............. G06Q 50/01 |
| | | | | 705/319 |
| 2018/0218448 | A1 | 8/2018 | Thomas et al. | |

(Continued)

*Primary Examiner* — Charles Rones
*Assistant Examiner* — Shirley D Hicks
(74) *Attorney, Agent, or Firm* — Buckley, Maschoff & Talwalkar LLC

(57) ABSTRACT

Provided are systems and methods that rely on machine learning to recommend employment opportunities. In one example, a method may include identifying, via execution of a first machine learning model, income data and spending data of a user, identifying, via execution of a second machine learning model, skill attributes of the user, determining, via execution of a third machine learning model, a recommended job for the user, where the determining comprises inputting the outputs from the first and second machine learning models into the third machine learning model, and displaying, via a user interface, a description of the recommended job.

20 Claims, 10 Drawing Sheets

100

Baseline Data 120 (Financial Data, Work Tasks, Schedule Data, etc.)

Derived Metrics 130 (Individual, Aggregate All, Aggregate Region, etc.)

Insights 140 (Machine Learning, Algorithms, Templates, etc.)

Insight Engine 110

Baseline Data Store 122

Derived Metrics Data Store 132

Insights Data Store 142

Communication Channel (email, SMS, MMS, phone, etc.) 150

100B

Baseline Data Store 122

Derived Metrics Data Store 132

Insights Data Store 142

Income / Visualization Machine Learning Layer 160

Communication Channel (email, SMS, MMS, phone, etc.) 150

(56)         References Cited

U.S. PATENT DOCUMENTS

| | | | |
|---|---|---|---|
| 2019/0066203 A1 | 2/2019 | Smith et al. | |
| 2019/0384861 A1* | 12/2019 | Ghoting | G06Q 10/105 |
| 2020/0126022 A1* | 4/2020 | Gaspar | G06Q 10/1053 |
| 2020/0137080 A1 | 4/2020 | Bloomquist et al. | |
| 2020/0327371 A1* | 10/2020 | Sharma | G06N 5/04 |
| 2020/0410427 A1* | 12/2020 | Haze | G06N 20/00 |
| 2021/0233162 A1 | 7/2021 | Hockey et al. | |
| 2021/0326980 A1 | 10/2021 | Thomas et al. | |

* cited by examiner

Figure 2B:
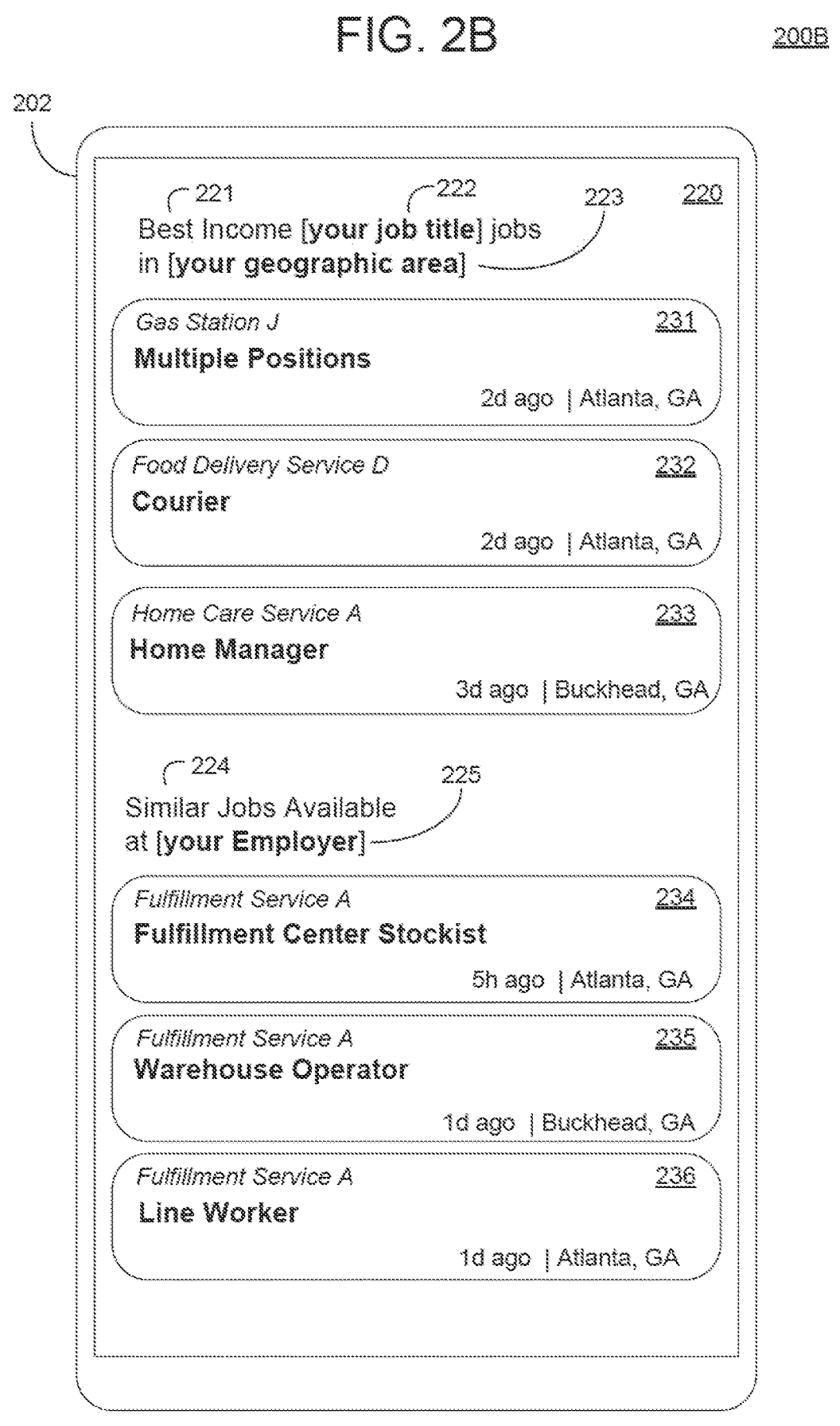

Best Income [your job title] jobs
in [your geographic area]

---

*Gas Station J*                                          231
Multiple Positions

2d ago  | Atlanta, GA

---

*Food Delivery Service D*                                232
Courier

2d ago  | Atlanta, GA

---

*Home Care Service A*                                    233
Home Manager

3d ago  | Buckhead, GA

---

224                                          225

Similar Jobs Available
at [your Employer]

---

*Fulfillment Service A*                                  234
Fulfillment Center Stockist

5h ago  | Atlanta, GA

---

*Fulfillment Service A*                                  235
Warehouse Operator

1d ago  | Buckhead, GA

---

*Fulfillment Service A*                                  236
Line Worker

1d ago  | Atlanta, GA

Figure 3C:
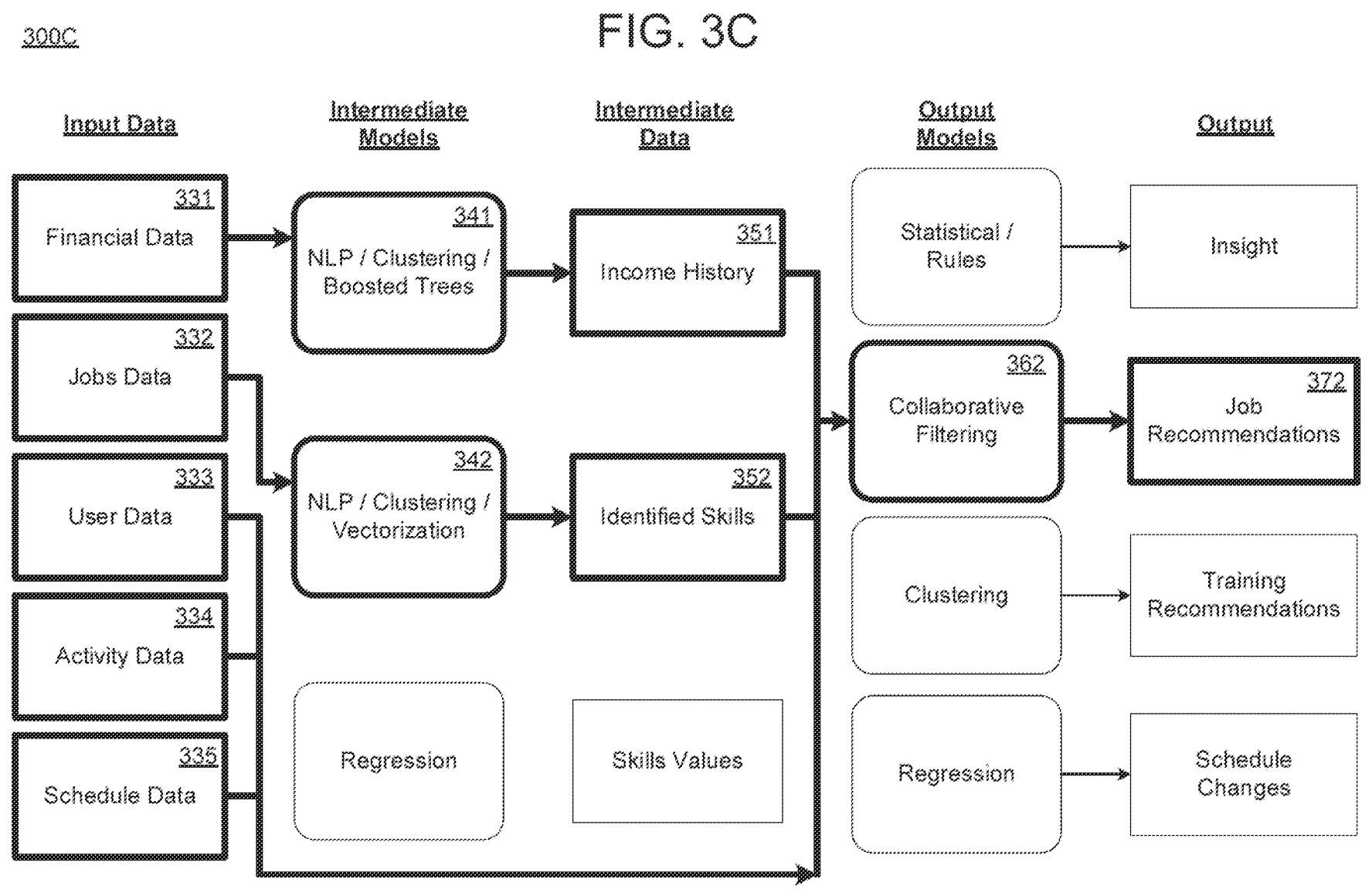

Output

Insight

372 Job Recommendations

Training Recommendations

Schedule Changes

Output Models

Statistical / Rules

362 Collaborative Filtering

Clustering

Regression

Intermediate Data

351 Income History

352 Identified Skills

Skills Values

Intermediate Models

341 NLP / Clustering / Boosted Trees

342 NLP / Clustering / Vectorization

Regression

Input Data

331 Financial Data

332 Jobs Data

333 User Data

334 Activity Data

335 Schedule Data

400

Identifying Income Data via Execution of a
1st Machine Learning Model

410

Identifying Skill Attributes via Execution of a
2nd Machine Learning Model

420

Determining, via a 3rd Machine Learning Model, a
Recommended Job based on Outputs from the 1st and
2nd Machine Learning Models

430

Displaying the Recommended Job

440

WORK INCOME VISUALIZATION AND OPTIMIZATION PLATFORM

CROSS-REFERENCE TO RELATED APPLICATIONS

This application is a continuation of U.S. patent application Ser. No. 17/161,747, filed on Jan. 29, 2021, in the United States Patent and Trademark Office, which claims the benefit of U.S. Provisional Application No. 62/968,187, filed on Jan. 31, 2020, in the United States Patent and Trademark Office, the entire disclosures of which are hereby incorporated by reference for all purposes.

BACKGROUND

Users are more connected on the Internet than ever before. This hyper-connected society has opened up new opportunities and avenues for making money. For example, picking up a temporary work engagement (e.g., a gig) is easy and made possible through many forums, mobile apps, websites, and the like. As a result of the "gig economy," people increasingly have multiple sources of income that blends together full-time, part-time, on-demand, one-off, and gig work. These individuals are faced with the challenge of generating the most income from the sources available to them by balancing a number of things such as limitations on the amount of work available, scheduling constraints, work-related expenses, variable compensation, alternative sources of income, and the like. What is needed is a way that can help a user visualize and optimize how they can best make money.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A and 2B are diagrams illustrating examples of a user interface for displaying insight and recommendations in accordance with example embodiments.

FIG. 3A is a diagram illustrating a process of a software application calling a machine learning service for recommendations in accordance with an example embodiment.

FIG. 3C is a diagram illustrating a machine learning sequence to generate a job recommendation in accordance with an example embodiment.

Figure 1A:
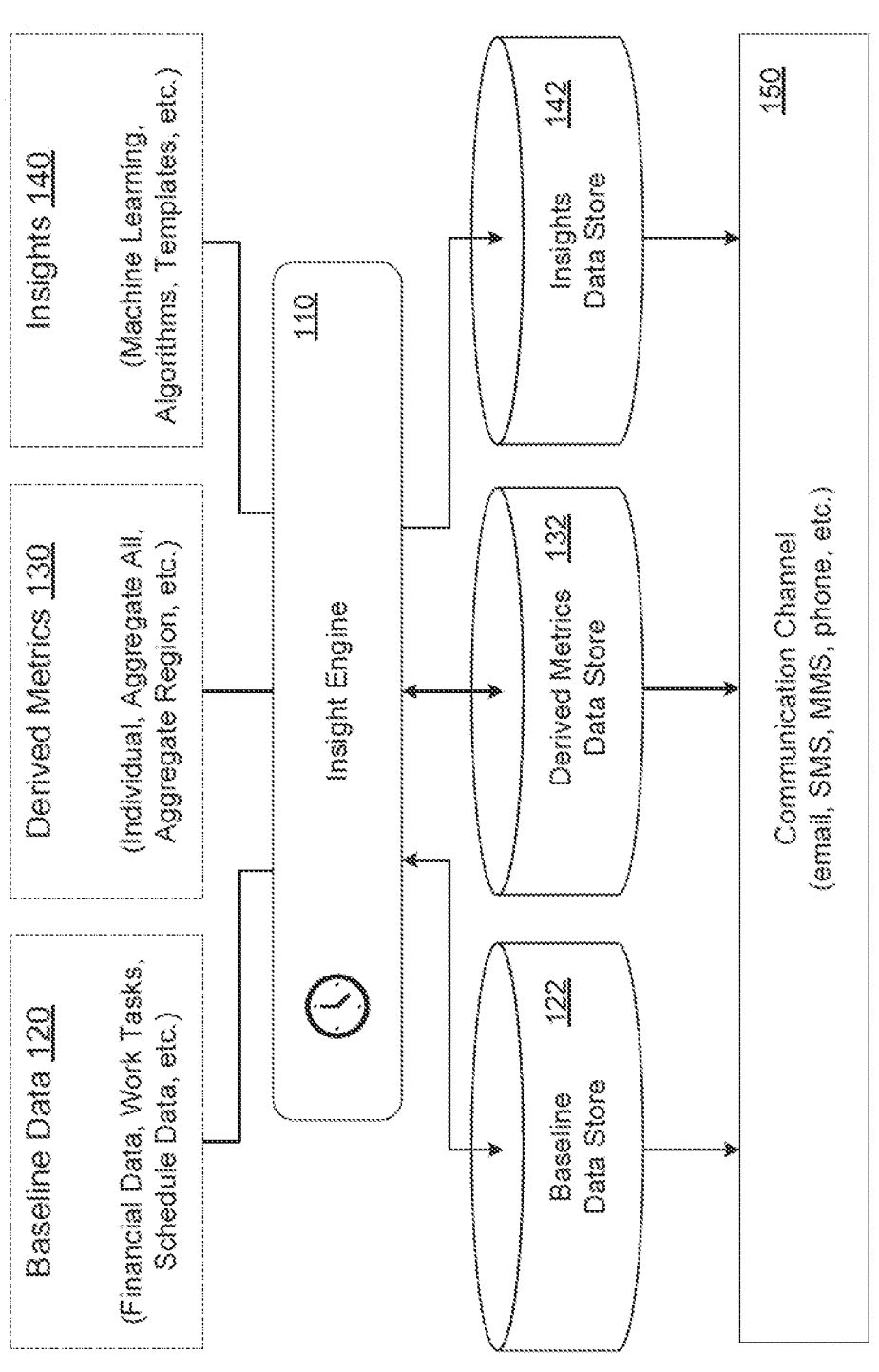
FIG. 1A is a diagram illustrating an architecture of a host platform including an insight engine in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown, but is to be accorded the widest scope consistent with the principles and features disclosed herein.

The example embodiments are directed to a platform that can recommend different employment opportunities to a user in order to improve how much income the user makes on a daily or hourly basis. In some embodiments, the platform may suggest a different work schedule, rather than a different job. As another example, the platform may suggest a training course or license to obtain in order to increase the income.

The example embodiments use machine learning models to collaboratively learn from a community of users and provide predictions to individuals based on data provided from a larger group. This enables sensitive information of the group of users to be used to provide predictions for another user, while at the same time keeping the sensitive information hidden. The platform can process the information via machine learning models to predict better opportunities for a user. The opportunities may be based on a particular job category, a particular geographical area, a particular time/day that the user desires to work, and the like.

With the advent of the "gig economy," people increasingly have multiple sources of income, frequently blending full-time, part-time, on-demand, one-off, and gig work. These workers are faced with the challenge of generating the most income from the sources available to them by balancing a number of things.

Limitations on the amount of work available. One of the easiest ways to increase income can simply be working more hours, however not all work allows this. Some income sources limit the number of hours available to workers, require registration for "shifts" ahead of time, or simply don't have the demand to offer workers more time.

Scheduling constraints. Workers have constraints on both the amount of time they can work and when they can work. For the most part, if they are working for one income source, they can't simultaneously be working for a second source of income. Additionally, workers might have other periods of time they are unavailable for work, which might be limitations like the schedules of their spouse and children. Even if additional hours are available for work, these other limitations factor in to when workers can take advantage of those hours.

Work-associated expenses. Work has additional expenses associated with it that impacts Net Income. Work far from a worker's home has transportation costs, such as fuel and wear-and-tear on the worker's own vehicle or public transportation costs. The time spent in transit also represents an opportunity cost—traveling an hour for a job could be an hour spent working for other income sources. Non-transit expenses are also a factor, such as cost of uniforms and other equipment, child-care costs during work hours, etc. All of these should ideally be taken into account to make the best decision of what work is the most beneficial to the worker.

Variable compensation. For some sources of income, the compensation may not be consistent for all times worked. By way of example, some gigs allow you to work on-demand, but that is no guarantee that income per hour will be the same. Demand, tips, bonuses, and time to perform work may vary dramatically based on time, location, weather, local events, and other factors that can dramatically affect income. Other work may also have variable compensation—for instance, a night shift may pay more than a day shift or there might be additional compensation in the form of overtime pay.

Alternative sources of income. In addition to income sources already established by workers is the ongoing search for new income sources that could result in improved income levels based on all of the factors above. For example, a new income source that pays more per hour, with no associated expenses, close to the worker's home, with increased flexibility of schedul-ing, and an unlimited amount of available hours that the worker is qualified for would have significant appeal. However, any combination of those factors could also make sense for a worker's specific needs compared to or in conjunction with existing income sources. Finding and evaluating these new opportunities is part of the challenge of workers today.

These are all examples of the enormous number of factors that workers must consider. What is needed is a way to collect and evaluate information about workers as individu-als as well as communities of workers in order to help make sense of all of the data. Presenting the underlying data in a way that helps workers make decisions and proactively offers insights and recommendations to workers is what is proposed.

The example embodiments are directed to an optimization platform that can ingest data from various different sources, aggregate and analyze the data to reveal metrics, views, performance information, insight, and other relevant visu-alizations, and output the information via a user interface. In some embodiments, the optimization platform may receive work-related data from a user as well as from other users in a same community of the user. The optimization platform can organize data from the different sources into a compre-hensive and aggregated view providing a user with a better understanding of their income, in order to help them make better (and more informed) decisions.

FIG. 1A illustrates an example of an insight engine 110 using baseline data 120 to derive metrics 130. The insight engine 110 may also derive insights 140 based on one or more of the baseline data 120 and the derived metrics 130. As further described below, triggers may be detected by the insight engine 110 which cause the insight engine 110 to derive metrics 130 from the baseline data 120. In addition, triggers may be detected by the insight engine 110 to derive the insights 140 from the derived metrics 130 and/or the baseline data 120. Triggers can be event-driven (e.g., based on a change in a data value, data values of other users, etc.). As another example, triggers can be time-driven (e.g., daily, weekly, monthly, etc.) The definition of what triggers the generation of a derived metric or insight is part of the insight engine 110 as is the logic regarding the evaluation of data, related calculations, and eventual output of a derived metrics 130 and the insights 140.

The insight engine 110 may retrieve the baseline data 120 from a data store 122, and generate the derived metrics 130 and the insights 140. In this example, the insight engine 110 may store the derived metrics 130 in a data store 132 and the insights 140 in a data store 142. Meanwhile, a communica-tion channel 150 which may be controlled or otherwise configured by a software application, etc., may communi-cate with the databases 122, 132, and 142, and send notifi-cations/insights to a user device (not shown). Here, the communication channel 150 may be email, SMS, MMS, phone call, or the like The insights 140 may include a textual description describing information that is relevant/helpful to the user. The insights 140 may provide the user with machine learning data, suggestions, recommendations, and the like, with respect to the tasks/jobs they are currently performing. As another example, the insights 140 may be based on an evaluation of aggregated data and/or metrics from other entities/users performing other tasks/jobs.

As an example, an insight may be created from the baseline data 120 such as a new transaction event where a bank fee has been added to a user's account. Here, the insight may include a notification that the bank fee event occurred, as well as an insight derived from the new transaction event such as "this brings your total for the month up to $70" which is based on both baseline data plus metrics.

Although FIG. 1 shows the baseline data 120, the derived metrics 130, and the insights 140 being stored in separate data stores, the embodiments are not limited thereto. As another example, the different data types may be stored together in a central data store, a blockchain, or the like.

Different triggers can be initiated by the insight engine which cause the metrics to be derived and the insights to be sent. For example, a baseline data change trigger can occur when new baseline data is received. Here, the insight engine can generate one or more derived metrics, generate an insight based on any baseline data that has changed when the new baseline data is stored, generate an insight based on a combination of baseline data and one or more derived metrics.

Another example of a trigger is a derived metrics change trigger. In this example, the insight engine can generate one or more derived metrics, generate an insight based on a derived metric that changed, generate an insight based on a combination of one or more derived metrics, and the like.

Another example of a trigger is a time-based trigger. In this example, the insight engine can derive new metrics and generate insight based on timing occurrences identified from a system clock, etc. For example, in response to a time-based trigger, the insight engine can create one or more derived metrics from baseline data, create one or more derived metrics from derived metrics, create one or more derived metrics from combination of baseline data and derived metrics, create one or more insights from baseline data, create one or more insights from derived metrics, create one or more insights from combination of baseline data and derived metrics, and the like.

Baseline data may be converted into two tiers of abstrac-tion, referred to as derived metrics and insights, through the use of triggers. This approach includes execution of predefined triggers to analyze baseline data and store the results as derived metrics as well as a second tier of triggers that will analyze both derived metrics and baseline data in order to create Insights to be shared with relevant audiences.

For example, baseline data may include a collection of information related to an entity, such as financial transaction or work information for the users of an app. Derived metrics triggers are rules that describe how and when baseline data should be evaluated to calculate and store derived metrics as well as the engine that executes those triggers. Derived metrics triggers might also act on other derived metrics and the results stored. Derived metrics are the stored results of derived metrics triggers related to individual entities or to entity cohorts. With this approach, the derived metrics repository continually updates as derived metrics triggers execute and the repository can be used by other data consumers for purposes such as up-to-date report generation or inputs to machine-learning models. This repository can also be used as part of the foundation to create insights.

Insight triggers are similar to derived metrics triggers, but monitor both baseline data and derived metrics. The insight trigger rules and engine that executes those rules produce insights. Insights are the result of insight triggers and are generally thought of as human-friendly content that communicates valuable information to relevant individuals and audiences based on the more complex data that generates that content, although insights could certainly take on additional forms.

In the examples herein, a "trigger" is used as a more generalized concept representing an action to be taken based on something that preceded it and should not be intended as a specific technical implementation such as a database trigger on a table update operation, insert operation, delete operation, or the like.

As a non-limiting example, on the third business day of a new month (a time-driven trigger), several derived metrics triggers execute and evaluate, create, and update derived metrics. For example, a derived metric may include total income for the prior month for all users (derived metric trigger acting on baseline data to sum and store all income transactions for the previous month per user).

Another derived metric may include maximum monthly income which results in the execution of an event-driven derived metrics trigger that compares that income to the maximum monthly income for each user. The derived metric may be stored for each user. If the new monthly income is greater, the maximum monthly income derived metric is updated with that value (derived metric trigger acting on derived metric and comparing it to another derived metric to determine if an update should occur).

Another derived metric may be income by income source. Similar to the above, subtotals of income from all income sources (ride sharing, delivery, freelance, etc.) are also calculated and stored for the previous month and compared to maximum monthly income derived metrics for each income source to determine if an update is needed.

Another example derived metric is average income by income source for all users grouped by MSA (Metropolitan Statistical Area). Different than a derived metric for an individual entity/user, this represents a derived metric for an entity cohort which includes a collection of users.

Another example derived metric is average income by income source for all users grouped by primary source of income (retail, manufacturing, construction, service, etc.) The metric represents another analysis by entity cohort (i.e. average income from company A users classified as "Retail Workers").

An example of insight is provided below. For example, a user that has achieved a new maximum monthly income from rideshare company U is sent an insight through push notification or SMS—"You made $425 driving for company U last month—a new record! That's $123 more than the average driver in Atlanta and $75 more than other retail workers that also drive for company U." This represents an event-driven insights trigger based on the update of the new maximum income by source derived metric. Here, another event-driven insight trigger fires based on the creation of the new monthly derived metrics, creating an insight available within the app announcing the top income source for each MSA for users that don't have any history of income from that income source—"The average income from company P for people in Chicago is $784! Click to apply now." On the 4th business day, a time-driven insights trigger sends an email to all users providing them with an overview of their income from the previous month as well as information from relevant entity cohorts. Above are only a few examples of how the various features of this model could be applied.

The baseline data may be the lowest level of data described in this approach and is received into the core of the insights engine as the starting point of the data repository that is the basis for the abstracted derived metrics and insights. Examples of baseline data include individual financial transactions such as purchases, income events, fees, and transfers, with information that might include financial institution, account identification, date, amount, category, funding source, and recipient. Additional transaction details might also be included such as—where applicable—principle, interest, and interest rate/APR information; sales tax; line item or SKU information; geographic information; etc.

Other examples of baseline data include individual or combination of work tasks such as delivery, rideshare, dog walk, or other services. Data could include, but not be limited to, source of work, total amount charged to recipient requesting task, income by worker including tip and/or bonus information, time taken to perform task(s), distance travelled, start and end location or other geographic information, start and end time, associated expenses, etc. Another example of baseline data is other work information. By way of example, this could include information on part-time or full-time work such as pay period; hours worked; schedule of hours worked; total income with details related to withholding, benefits, etc.; details of the work performed; geographic information; expenses; etc. Other examples of baseline data include geographic information by itself could also be included as baseline data, with information ranging from time-stamped Lat/long at the most basic level to a variety of supplemental information depending on the data source.

Figure 1B:
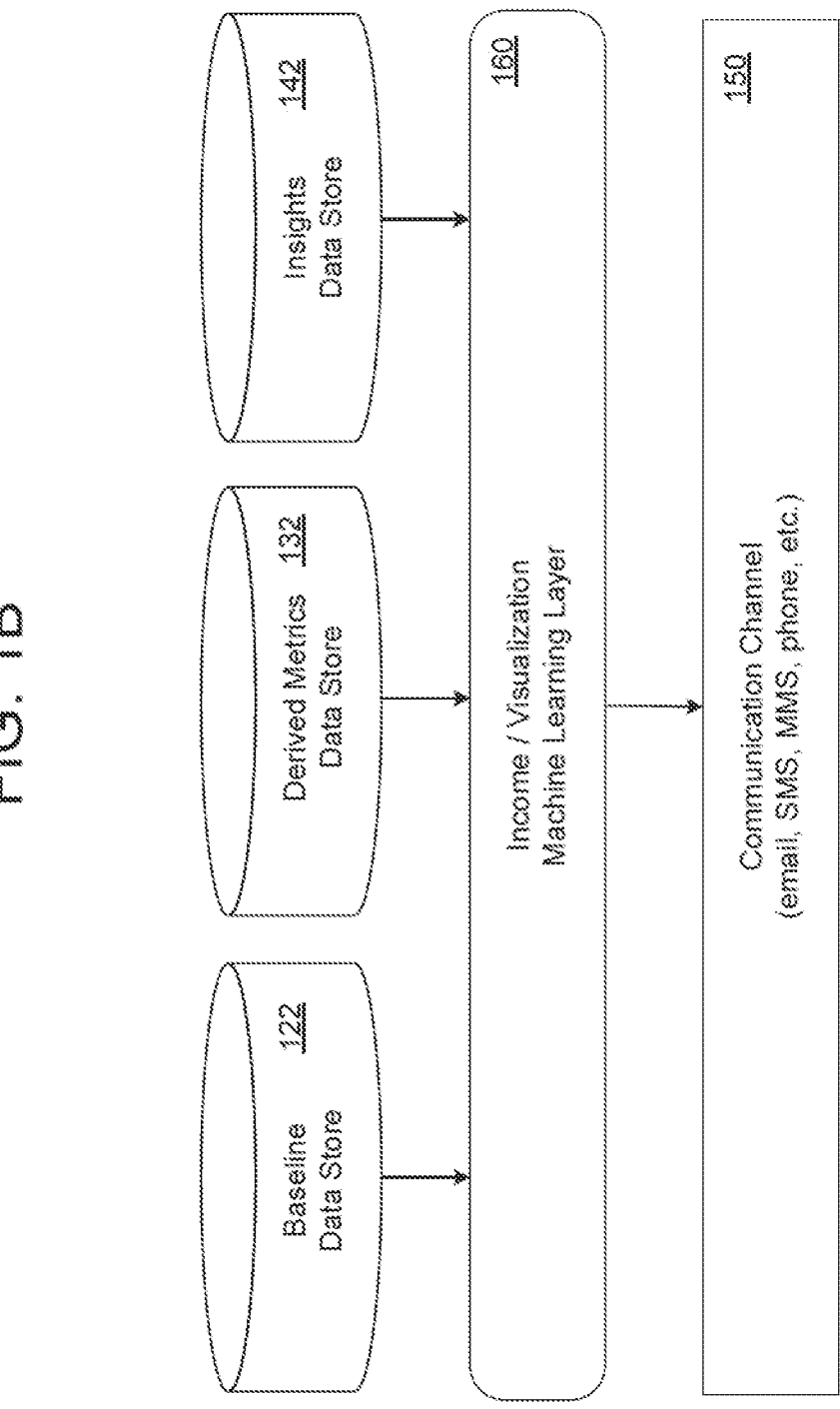
FIG. 1B is a diagram illustrating an architecture of a machine learning layer in accordance with an example embodiment.

FIG. 1B illustrates an architecture 100B of a machine learning layer 160 in accordance with an example embodiment. Referring to FIG. 1B, according to various embodiments, the data that is stored within any of the baseline data store 122, the derived metrics data store 132, and the insights data store 142, may be used by the machine learning layer 160 to create suggestions on how to improve/optimize income earned by a user. For example, the machine learning layer 160 may identify other users that have job categories and geographical locations that are similar to a respective user, identify better income earning opportunities for the respective user based on the other users in a collaborative manner, and output a visualization (e.g., email, electronic message, in-app window notification, etc.) with the recommended income earning opportunity.

Here, the machine learning layer 160 may receive data from one or more of the baseline data store 122, the derived metrics data store 132, and the insights data store 142, convert the data into predictions, and output the predictions via one or more communication channels 150. The recommendations that are provided to the user may include new employment opportunities at different organizations than where the user currently works, different employment opportunities at an organization where the user currently works, a change to a work schedule, a change in jobs altogether, a change in geographical area in which to perform the job, and the like. In some embodiments, the machine learning layer 160 may be used to predict training courses, educational classes, licenses to obtain, etc. to help the user improve their income earning opportunities.

The machine learning layer 160 may include a plurality of machine learning models that are interconnected with each other as shown in the examples of FIGS. 3A-3D. For example, depending on the type of prediction to be made (e.g., job recommendation, schedule change recommendation, training, etc.), the machine learning layer 160 may execute a different sequence of machine learning models. For example, a job recommendation prediction may include a plurality of machine learning models being executed on different input data. The "ensemble" of machine learning models may be selected by a service on the host platform based on the type of prediction to be made. An output of a first machine learning model may be routed to an input of a second machine learning model, enabling a cascading execution of machine learning models.

The machine learning models may receive different input data. In some cases, the machine learning models may receive the same or partially overlapping input data. The host platform may select a "route" through the machine learning layer based on the type of prediction being performed.

Figure 2A:
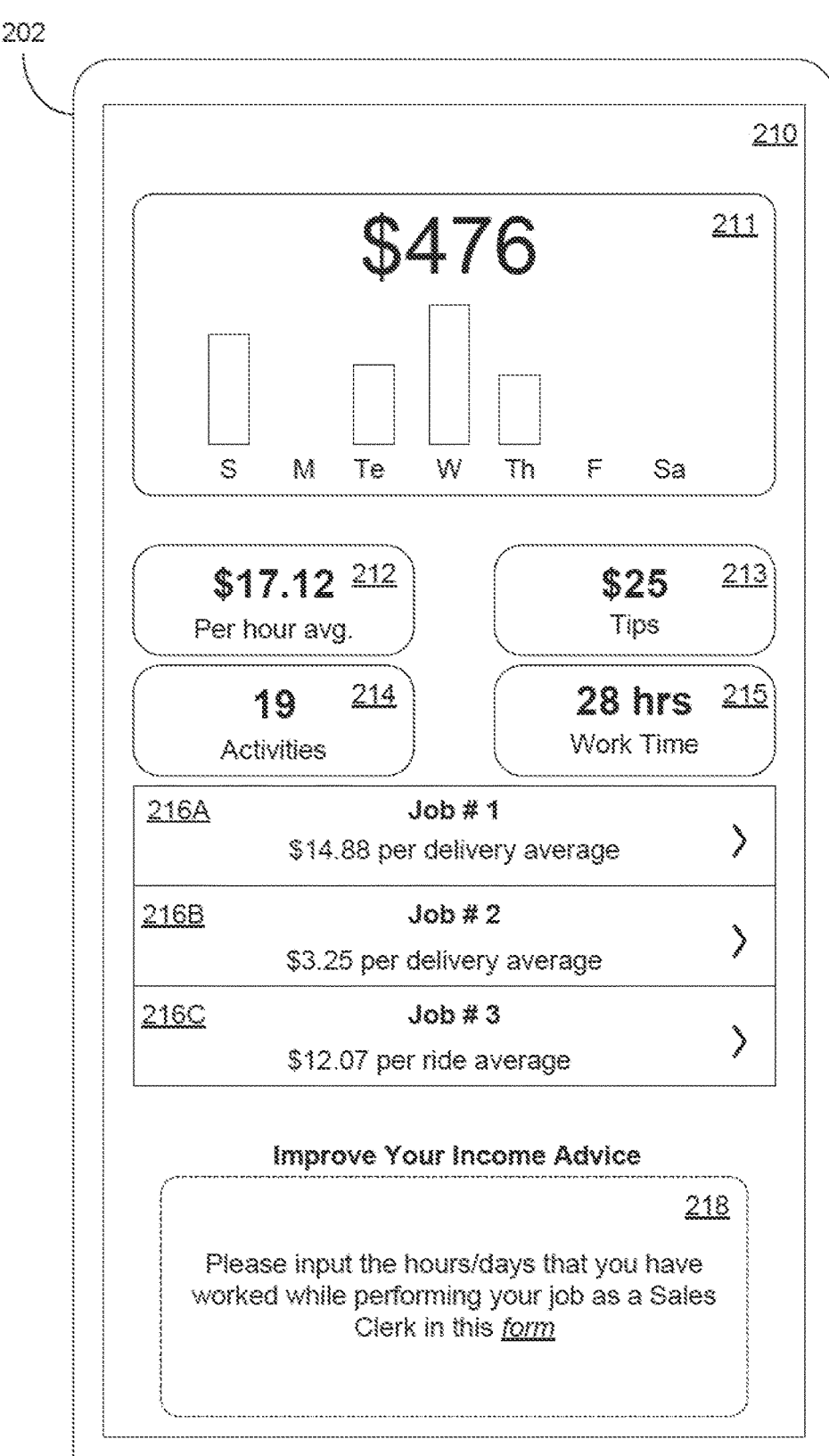

FIGS. 2A and 2B illustrate examples of a user interface for displaying insight and recommendations in accordance with example embodiments. According to various examples herein, the recommendations and insight created by the machine learning may be output via one or more of a message, an email, an in-app user interface, and the like. To output the recommendation, a template or frame may be selected and populated with both information from the prediction and information from the data used to make the prediction. The template/frame may include predefined content that is embedded therein with blank spaces where content from the prediction and content used to make the prediction can be inserted. Which template/frame to use may be selected by the host platform based on the recommendation being output. For example, an income visualization (FIG. 2A) may have a different format and data blanks than a job recommendation visualization (FIG. 2B). The templates may be predefined in advance and stored within a memory of the host platform.

FIG. 2A illustrates a process 200A of display data to a screen of a mobile device 202 which includes a user interface 210 that is output from a host server/cloud such as host platform 100 shown in FIGS. 1A-1B. The user interface 210 includes a window 211 which has a display of the amount of income earned for the most recent week. The window 211 further includes bar graphs that break down income on a daily basis. In this example, the user is someone who has three (3) different temporary jobs The system can aggregate data from across the three different jobs and provide a comprehensive and organized understanding of the data. In this example, the window 211 includes daily earnings combined from all three of the users jobs.

Furthermore, window 212, 213, 214, and 215, show additional details associated with the user's income for the week. For example, window 212 displays the average amount earned per hour over the week from all three jobs, window 213 shows the number of tips received from all three jobs, window 214 shows the number of activities performed by the user (e.g., rides, deliveries, etc.), and window 215 shows the total amount of time worked to generate the income for the week. The user interface 210 further includes additional bars 216A, 216B, and 216C with additional information about each of the three jobs performed. Each of the windows 211, 212, 213, 214, and 215, and the bars 216A, 216B, and 216C, and be selected by the user to further drill down into the information associated therewith.

In some embodiments, the user interface 210 may include a window 218 or something similar which provides income advice to a user. When the user selects on button, etc., the user may be provided with additional suggestions/recommendations on how to improve their income. For example, the host platform may proactively make recommendations for where, when, and what work opportunities would optimize income for a particular user based on the user's schedule, the user's current availability, existing job opportunities listed on a website, stored in a database, etc. The host platform may capture income earning information/data from a community of users and gain insight based on the community as a whole. Therefore, the host platform can provide individual suggestions to a particular user based on the user's attributes and also income earning information of the community of users. In some embodiments, the host platform may identify compensation model trends that might indicate one source of income becoming more or less lucrative, provide a comprehensive report on tax-related data—such as mileage—that would identify tax-benefits for the worker, recommend other income sources that might be of interest for the worker, and the like.

You work for a first company, but you may be able to make more working for a second company. The user interface could provide this information within the income advice window 218.

Work Data

Types of Data

The type of data collected for the solution proposed can consist of, but not be limited to:

General Employment Information

Employer information (industry codes/categories,

Employment type (full time, part time, etc)

Employee category (W-2, 1099, etc)

Employment history (start date, end date, specific shift details, etc)

Job Title and Job Title History

Compensation rate (Annual Salary, Hourly Rate, etc)

Payment schedule (daily, weekly, bi-weekly. Monthly, etc)

Employment and/or Home address. Especially useful for looking up tax rates for worker Marital Status Tax deductions Income and expense information Pay period history Income details (wages, tips, bonuses, commissions, royalties, expense reimbursement, etc)

Withholding details (Federal tax, state tax, Medicare, Social Security, 401k, Health Insurance, etc)

Expense information

Summary information of the above (Month to date, year to date, etc)

Other information, frequently relevant for, but not limited to gig work

Individual task information start/end time start/end location

Weather and other events happening within a predetermined distance of the latitude and longitude of the user device Financial break down of task(s) (Charged price of customer, expenses, direct income, tips, bonuses, expenses, fees, etc)

Other details of task(s) (type of service; number of deliveries, rides, walks, etc; number of riders; distance; rating; feedback on task(s)

Constraint information

Available work schedule

Skills and attributes that might be prerequisites for certain types of work (i.e. experience working with POS system or as a bartender)

Available resources (i.e. having a car for delivery jobs)

Sources of Data

Data could be collected through a variety of mechanisms, including, but not limited to:

Direct access of data from a 3rd party data source

Electronic transmission/replication of data from 3rd party data sources

Electronic transcription of relevant data via means such as "web crawlers"

Manual entry of data from workers or others

Automatic data from the user's device such as GPS data, etc.

Transcription of data either manually or through electronic tools such as OCR (i.e. scanning in of paystub, W-2, etc).

3rd party data sources could include, but are not limited to:

Direct connection with employer/income source

Payroll service providers

Governmental agencies such as the IRS

3rd party companies or organizations that provide services to aggregate this type of information Weather and local event data sources as well as the GPS data from the user device The types of data described can be organized and analyzed to provide workers with a better understanding of their income in order to help them make informed decisions. The image below represents one possible example.

FIG. 2A includes an example of income earned by a worker over the course of a week broken down by day and income source—in this case, DOORDASH® (Job #1), POSTMATES® (Job #2), and LYFT® (Job #3). They also are shown metrics of effective income per hour, tips, total activities/tasks performed (i.e. delivery and rideshare) total hours worked, and income per delivery or rideshare by income source.

The worker can explore this data by drilling into a detailed view of income by day or by income source. Different income sources may have different details based on the available data. In the case of LYFT®, location information is available resulting in a map of activities as well as a breakdown of income per mile and total mileage.

Also shown in the Daily Income breakdown across all income sources is a "Tips" bubble at the bottom of the screen that offers ideas that might help the worker based on the work data we have for them. This could consist of a range of suggestions ranging from advice from other workers to products and services that might be relevant and useful to the worker based on their data.

From this data, workers can make better informed decisions about when and where to do which job, understand which sources of income are more effective for them, identify potential work-related costs, and see information that might have tax implications—the latter two related to the mileage required to perform this work.

More advanced features could analyze the available data for the worker—combined with data from other, similar workers—and proactively make recommendations for where, when, and what work would optimize income, identify compensation model trends that might indicate one source becoming more or less lucrative, provide a comprehensive report on tax-related data—such as mileage—that would identify tax-benefits for the worker, recommend other income sources that might be of interest for the worker, etc. The worker could provide scheduling information and location preference to further improve recommendations or these types of factors could be predicted by the recommender based on historic and other information for the worker (i.e. historic times of work and home location).

In some embodiments, the system may use machine learning, collaborative filtering, look-alike modeling, statistical modeling, and/or the like, to identify patterns and trends in income optimization. Data from a community of users of the system may be analyzed to provide recommendations for optimizing income to a particular user based on the respective user's current income earning jobs and what other users in the community are doing.

While the example uses data from gig income sources, this could be extended to include other types of work. For example, income from a full-time or part-time job and data associated for the particular type of work such as schedules and shifts, health insurance and retirement programs with associated contributions, tax and other withholding information, etc. The goal being to provide a comprehensive overview of work in a single place so workers are informed and can make work and financial decisions to better meet their needs assisted by recommendations from the solution to reduce mental effort of the worker.

Some of the Benefits of the System

Collect or provide a means to collect data related to work income.

Present work data and derived analysis of data to workers

Analyze individual worker data combined with other workers' data to offer insights and recommendations on how to better accomplish their goals, which might include improving income, optimizing time, minimizing expenses, etc.

Recommend new sources of income

Recommend new skills or certifications that will help works increase their income Offer optimized work schedules for workers Organize data for workers to facilitate other activities, such as identifying tax-related expenses.

Offer users financial or other products based on their data. For instance, car insurance or fuel discounts for delivery drivers, 401k or SimpleIRA plans for workers without such plans from their employer, etc.

FIG. 2B illustrates a process 200B of displaying job recommendations via an in-app user interface 220 displayed on the mobile device 202 in accordance with an example embodiments. Referring to FIG. 2B, the host platform has identified (e.g., via machine learning) recommended job opportunities for a particular user that will likely improve the income earned by the user. In this example, the process 200B includes the host platform selecting a template that includes the user interface 220 having a first description 221 and a second description 225 embedded in the template and which are to be filled-in with data of the user. Here, the template may include a frame/page of content from a mobile application or a web page/web application with blank spaces of content to be filled in. In this example, the first description 221 includes space 222 and space 223 to be filled in with user data. In particular, the space 222 is to be filled in with a description of a job title (e.g., warehouse technician, grocery stockiest, delivery driver, etc.). Furthermore, the space 223 is to be filled in with a description of a geographic area (e.g., Chicago, IL, Atlanta, GA, New York, NY, etc.).

Underneath the description 221 is a list of recommended job opportunities 231, 232, and 233 which include details of the job such as title, company, day/time of posting, geographic location, etc. In this example, the machine learning identifies the best income earning jobs for the user based on job opportunities in the same field that the user currently works in, and the same geographical area that the user currently works in. Thus filters can be applied to the data to reduce the data processed by the machine learning models. For example, a filter may be used to limit the geographical area of the jobs, and another filter may be used to limit a job category/type of the jobs.

The description 224 includes a blank space 225 to be filled-in with a name of a current (or most recent) employer of the user. Underneath the description 224 is a list of recommended job opportunities 234, 235, and 236 which include details of the job such as title, company, day/time of posting, geographic location, etc. In this example, the machine learning identifies the best income earning jobs for the user based on job opportunities at the same employer. Thus filters can be applied to the data to reduce the data processed by the machine learning models. For example, a filter may be used to limit the employer to a particular company, subsidiary, etc.

Other filters could also be applied to limit the data. For example, time of day, job title, income levels, geographic location, and the like, may be used to reduce the amount of data that is processed by the machine learning layer 160.

Figure 3A:
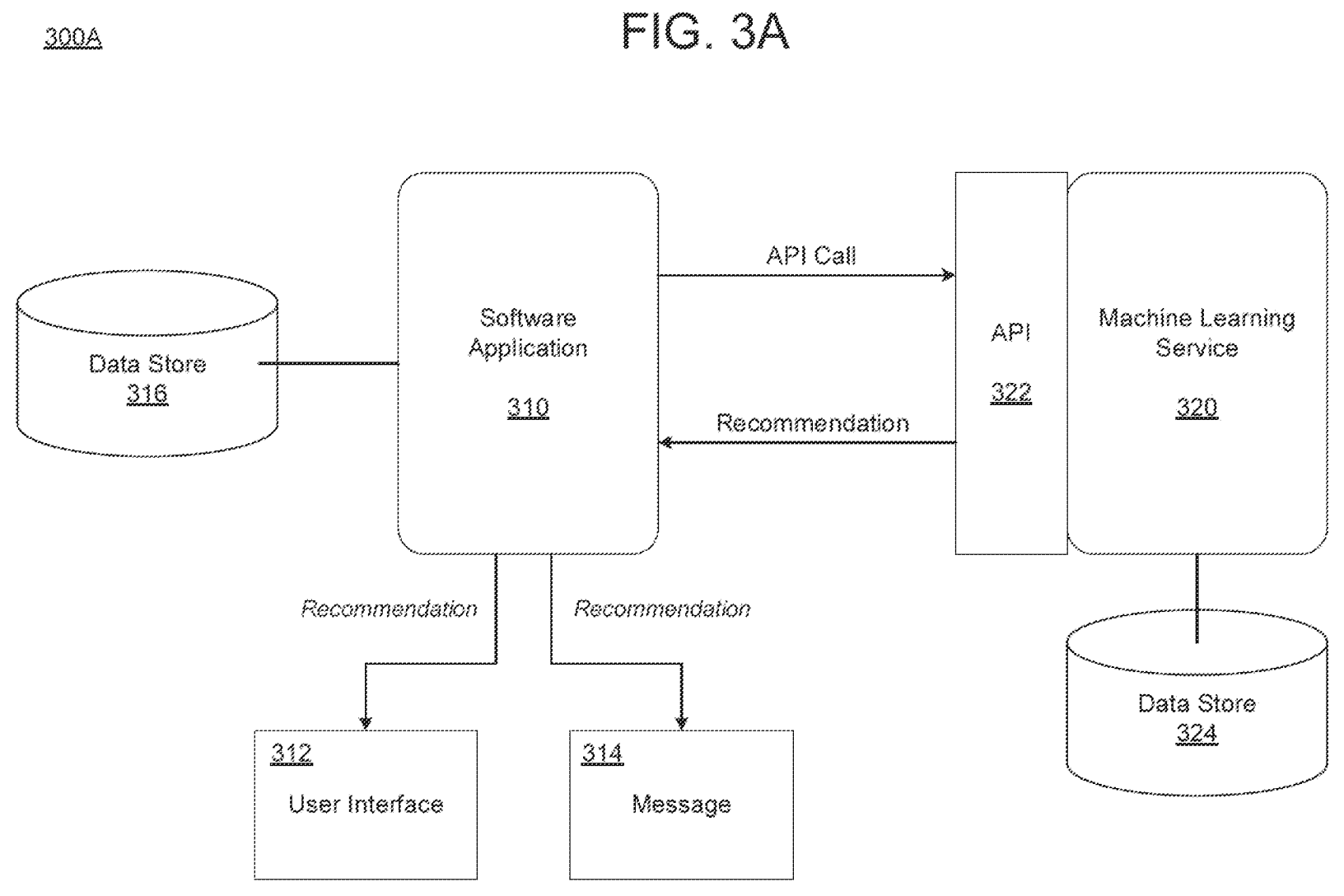

FIG. 3A illustrates a process 300A of a software application 310 calling a machine learning service 320 for recommendations in accordance with an example embodiment. For example, the machine learning service 320 may represent the machine learning layer 160 shown in FIG. 1B. The machine learning service 320 may be executing on a host platform such as a web server, a cloud platform, a database, an on-premises server and the like. The software application 310 may also be running on the host platform or it may be running on an external device and may connect to the host platform via a network such as the Internet. Here, the machine learning service 320 includes an application programming interface (API) 322 that enables the software application 310 to request machine learning. In this example, the software application 310 may include a data store 316 with information about jobs and users. Likewise, the machine learning service 320 may include a data store 324 with information about jobs and users. For example, the data stores 316 and 324 may include any of the baseline data store 122, the derived metrics data store 132, and the insights data store 142, shown in FIG. 1A.

As an example, the software application 310 may be a mobile application that is hosted by a backend server and provided to client devices. Here, the software application 310 may display recommendations via a user interface 312 of the mobile application. As another example, the software application 310 may be a messaging application capable of transmitting a message 314 including a recommendation to a client device.

The software application 310 may trigger the machine learning service 320 based on predefined triggers (e.g., time-based triggers, data-based triggers, etc.) For example, a trigger may occur every Wednesday at a predetermined time. As another example, a trigger may occur each time new data is stored by the host platform. Here, the software application 310 may generate an API call which includes a payload of data to be processed by the machine learning service 320, an identifier of a machine learning model, or models to be used, and the like. In some embodiments, the API call may include a sequence of machine learning models to be called (e.g., an ensemble of models, etc.)

The machine learning service 320 may receive the API call and identify a sequence of machine learning models to execute, data to be input into the machine learning models, and an output to be provided back to the software application 310. Examples of selecting machine learning models (e.g., by the machine learning service 320) are shown in the examples of FIGS. 3B-3D.

Figure 3B:
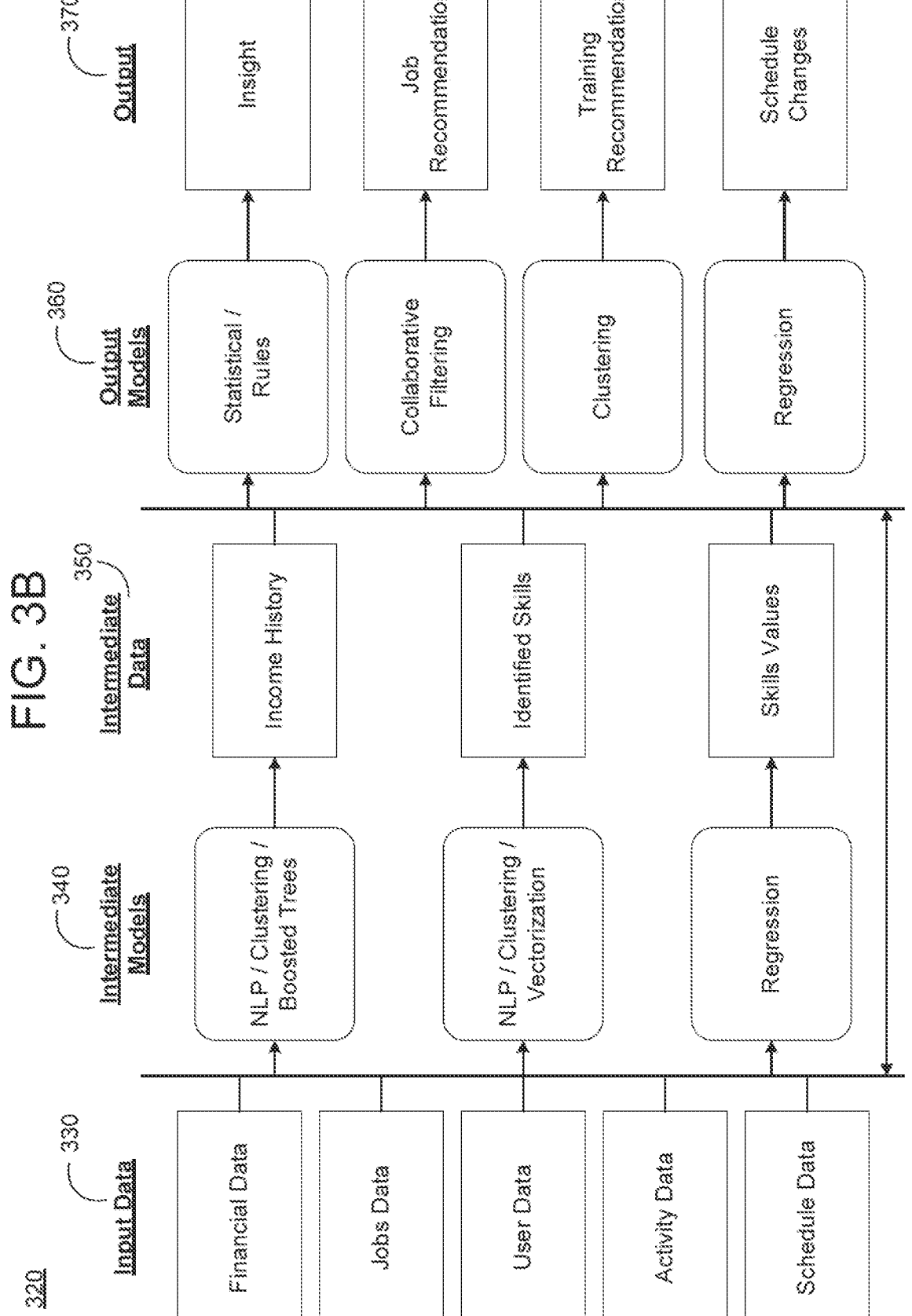
FIG. 3B is a diagram illustrating input/output relationships of machine learning models within the machine learning service in accordance with an example embodiment.
Figure 3D:
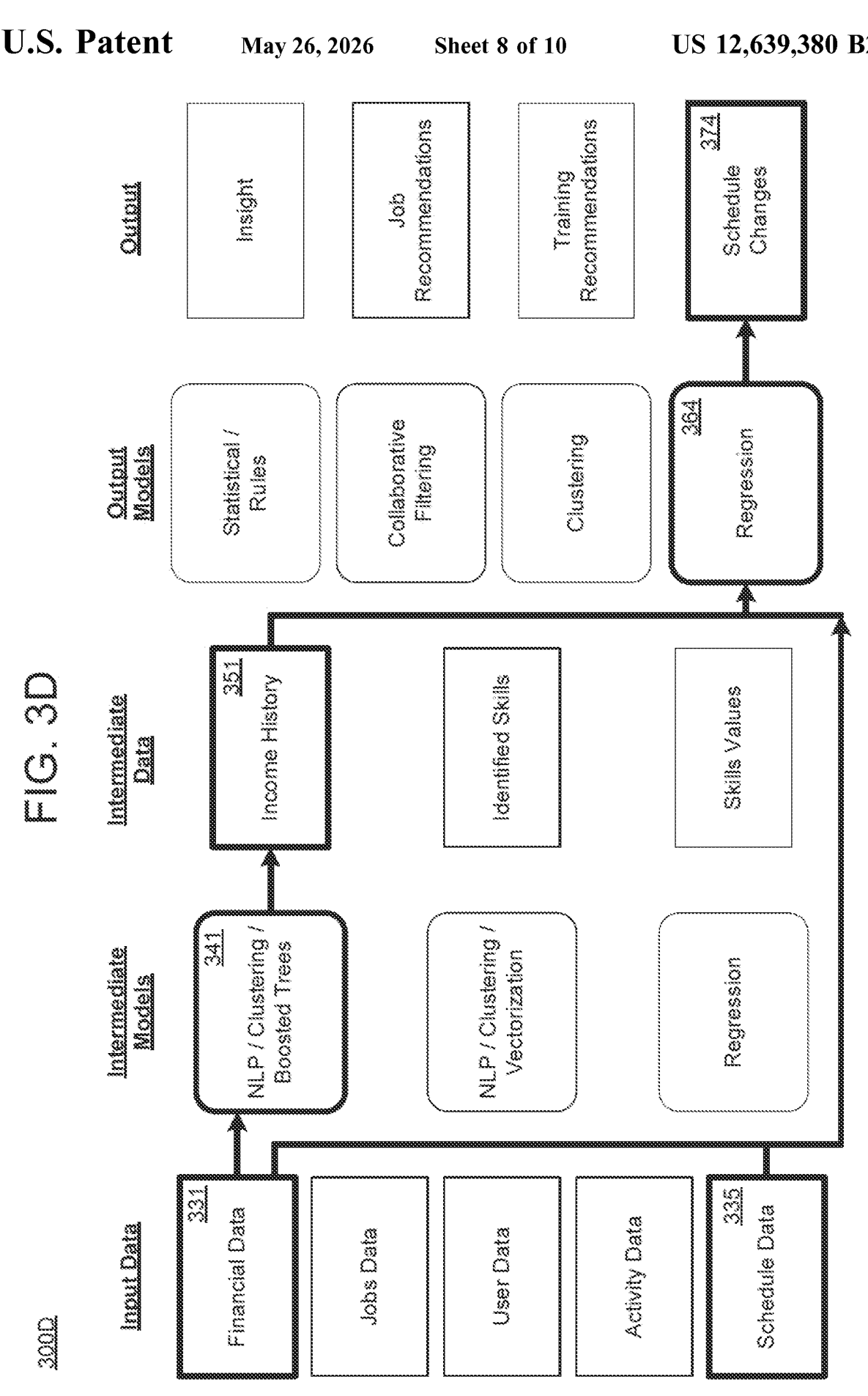
FIG. 3D is a diagram illustrating a machine learning sequence to generate a schedule change recommendation in accordance with an example embodiment.

FIG. 3B illustrates input/output relationships of machine learning models within the machine learning service 320 in accordance with an example embodiment. It should be appreciated that the types of input data and the machine learning models are merely for purposes of example and different data, models, and the like, may be included within the machine learning service 320. According to various embodiments, the machine learning service 320 can dynamically select a path/route among the models and data within the machine learning service 320 to generate a desired output/recommendation.

Referring to FIG. 3B, the machine learning service 320 includes a plurality of different input data 330, a plurality of intermediate machine learning models 340 (which may be model ensembles), intermediate data 350 that results from the execution of the intermediate machine learning models 340 on the input data 330, output machine learning models 360 that may receive as inputs any of the input data 330 and the intermediate data 350 and outputs various data 370. Each of the different output values 370 may be created by executing different sequences of models within the machine learning service 320. The machine learning service 320 may store a predefined sequence of machine learning models to execute to generate a particular output 370. As another example, the API call from the software application 310 may specify one or more of the data to be input and the models to be executed within the machine learning service 320.

According to various embodiments, output from one machine learning model may be an input into another machine learning model within the machine learning service 320. The input/output relationships may be identified by the API call, or they may be determined by the machine learning service 320 in response to a request for a particular output value 370. When a request for machine learning is received, the machine learning service may select a sequence of models within the machine learning service 320 to be executed, input data into the first machine learning model in the sequence, connect the output of the first machine learning model to a second machine learning model in the sequence, and the like. Thus, the machine learning service 320 may establish a route among the data and the models within the machine learning service 320. This enables the machine learning service 320 to dynamically select a machine learning model ensemble to perform a particular recommendation.

In this example, the intermediate data 350 that is created by a first machine learning model 340 may be an input to an output machine learning model 360. As another example, the intermediate data 350 may be an input to another intermediate machine learning model 340. Likewise, the output machine learning models 360 may receive inputs from the outputs of the intermediate machine learning models 340. In addition, the output machine learning models 360 may receive input from the input data 330 (i.e., data that has not been processed through a machine learning model 340). The machine learning models may include natural language processing (NLP) which is able to identify words within unstructured text/description, clustering which clusters similar data categories together, regression, time-series, boosted trees or other types of decision trees, neural networks, and the like.

FIG. 3C illustrates a machine learning sequence 300C to generate a job recommendation in accordance with an example embodiment. Referring to FIG. 3C, the machine learning service 320 receives a request (e.g., an API call, etc.) to generate a job recommendation for a user A. In this example, the machine learning service 320 identifies a path/route within the machine learning models/data in order to generate the job recommendation. Here, the path is recommended by the thick dark line. In particular, financial data 331 (e.g., payroll data, bank transactions, etc.) of the user A and other users of the system are input into a first machine learning model ensemble 341 which includes an NLP algorithm, a clustering algorithm, and a boosted trees algorithm. The output of the machine learning model 341 is income history 351 which includes spending habit data, hourly pay rate, etc. Meanwhile, jobs data 332 of the user A and of other users is input into an intermediate machine learning model ensemble 342 which includes natural language processing, clustering, and vectorization. The output of the machine learning model ensemble 342 is skills data 352 that is identified of a job category associated with the user or of a plurality of users.

The income history data 351 output from the intermediate machine learning model ensemble 341 and the skills data 352 output from the intermediate machine learning model ensemble 342 are input into an output machine learning model 362. In addition, user data 333 (resume information, etc.) of the user and of other users, activity data 334 (e.g., in-app clicks, loads, etc.) of the user and other users, and schedule data 335 (time entries, work schedules, etc.) of the user and other users are also input into the output machine learning model 362. Based on these inputs, the output machine learning model 362 generates a recommend job 372 or list of jobs (e.g., such as shown in FIG. 2B in items 231-236) for the user A. In this example, the output machine learning model 362 may be a collaborative filtering model. The resulting recommendation 372 may be added to a template that is selected from among a group of templates such as shown in the example of FIG. 2B, and displayed via a user device. As another example, the recommendation 372 may be transmitted via an email or an electronic message.

FIG. 3D illustrates a machine learning sequence 300D to generate a schedule change recommendation in accordance with an example embodiment. In this example, the machine learning service 320 receives a request (e.g., an API request, etc.) to generate a suggested change to a work schedule of a user. Referring to FIG. 3D, in response to the request, the machine learning service 320 dynamically selects a different sequence of models to be executed and also data to be input into the models. Here, the machine learning service 320 inputs financial data 331 into the intermediate machine learning model 341 to generate the income history data 352. Next, the income history data 352 output from the intermediate machine learning model ensemble 341 may be input into an output model 364. In addition, schedule data 335 of the user may be input into the output machine learning model 364. The output of the output machine learning model 364 is a suggested change to the work schedule of the user 374. The suggested change may include a recommendation to work at a different time, a different day, etc. in order to make more income.

Figure 4:
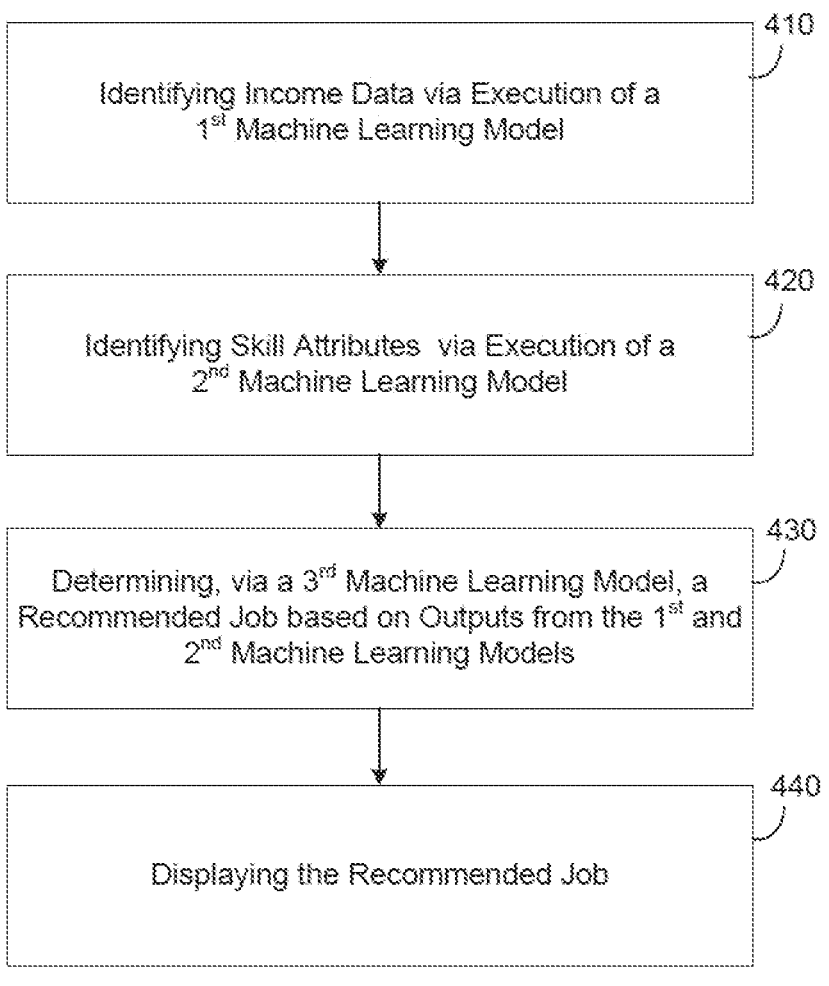
FIG. 4 is a diagram illustrating a method of generating and displaying a job recommendation in accordance with an example embodiment.

FIG. 4 illustrates a method 400 of generating and displaying a job recommendation in accordance with an example embodiment. As will be appreciated, the example of FIG. 4 is just one example of a flow, and is not limited thereto. Furthermore, one or more of the steps shown in FIG. 4 may be omitted and/or performed in a different order. Also, different steps may be included which are not shown. For example, the method 400 may be performed by a host platform receiving data from different external sources, via the Internet.

Referring to FIG. 4, in 410, the method may include identifying, via execution of a first machine learning model, income data and spending data of a user, wherein the identifying the income data and spending data comprises inputting financial data of the user into the first machine learning model which outputs the income data and the spending data. For example, the first machine learning model may be ensemble that includes a natural language processing (NLP) algorithm and a decision tree algorithm, although embodiments are not limited thereto.

In 420, the method may include identifying, via execution of a second machine learning model, skill attributes of the user, wherein the identifying the skill attributes comprises inputting a job description of the user into the second machine learning model which outputs the skill attributes. For example, the second machine learning model comprises an ensemble that includes a natural language processing (NLP) algorithm and a clustering algorithm, but embodiments are not limited thereto.

In 430, the method may include determining, via execution of a third machine learning model, a recommended job for the user, wherein the determining comprises inputting the outputs from the first and second machine learning models into the third machine learning model which outputs an identifier of the recommended job. Furthermore, in 440, the method may include displaying, via a user interface, a description of the recommended job. In some embodiments, the third machine learning model may include a collaborative filtering model that receives as input vectors output from the first and second machine learning models, and which outputs a vector that identifies the recommended job, although embodiments are not limited thereto.

In some embodiments, the method may further include receiving a schedule of work of the user, and determining, via execution of a fourth machine learning model, a recommended change to the schedule of work of the user, wherein the fourth machine learning model receives as input the output of the first machine learning model and the work schedule of the user, and outputs an optimized work schedule. In some embodiments, the method may further include selecting a template description from among a plurality of template descriptions based on a job category of the recommend job, and inserting a description of the recommended job into a blank space within the selected template description. In some embodiments, the displaying may include at least one of outputting the filled-in template via a mobile application and transmitting the filled-in template via an electronic message.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
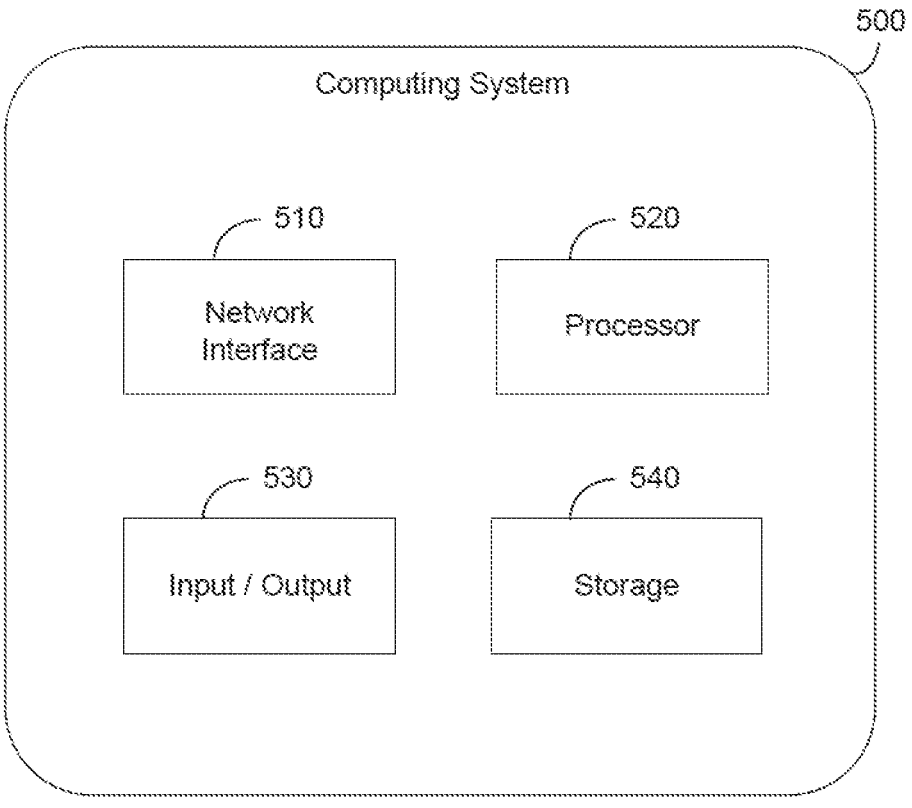
FIG. 5 is a diagram illustrating a computing system for use in the example embodiments described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 5 illustrates an example computing system 500 which may represent or be integrated in any of the above-described components, etc. FIG. 5 is not intended to suggest any limitation as to the scope of use or functionality of embodiments described herein. The computing system 500 is capable of being implemented and/or performing any of the functionality set forth hereinabove.

The computing system 500 may include a computer system/server, which is operational with numerous other general purpose or special purpose computing system environments or configurations. Examples of well-known computing systems, environments, and/or configurations that may be suitable for use as computing system 500 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 500 may be a tokenization platform, server, CPU, or the like.

The computing system 500 may be described in the general context of computer system-executable instructions, such as program modules, being executed by a computer system. Generally, program modules may include routines, programs, objects, components, logic, data structures, and so on that perform particular tasks or implement particular abstract data types. The computing system 500 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 5, the computing system 500 is shown in the form of a general-purpose computing device. The components of computing system 500 may include, but are not limited to, a network interface 510, one or more processors or processing units 520, an output 530 which may include a port, an interface, etc., or other hardware, for outputting a data signal to another device such as a display, a printer, etc., and a storage device 540 which may include a system memory, or the like. Although not shown, the computing system 500 may also include a system bus that couples various system components including system memory to the processor 520.

The storage 540 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 540 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 540 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 500 may also communicate with one or more external devices such as a keyboard, a pointing device, a display, etc.; one or more devices that enable a user to interact with computer system/server; and/or any devices (e.g., network card, modem, etc.) that enable computing system 500 to communicate with one or more other computing devices. Such communication can occur via I/O interfaces. Still yet, computing system 500 can communicate with one or more networks such as a local area network (LAN), a general wide area network (WAN), and/or a public network (e.g., the Internet) via network interface 510. As depicted, network interface 510 may also include a network adapter that communicates with the other components of computing system 500 via a bus. Although not shown, other hardware and/or software components could be used in conjunction with the computing system 500. Examples include, but are not limited to: microcode, device drivers, redundant processing units, external disk drive arrays, RAID systems, tape drives, and data archival storage systems, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to:
    store baseline data collected from a plurality of different data sources in a storage device, the baseline data comprising baseline employment data of a plurality of users;
    ingest data records of the plurality of users from the plurality of different data sources;
    determine that an event has occurred for a user based on a change to baseline data of the user that is identified from the ingested additional data records;
    identify, by a machine learning service in response to the determination of the occurrence of the event, an execution sequence of one or more machine learning models of a software application to be executed and specific data of the baseline data to be input into the one or more machine learning models, the execution sequence specifying input and output relationships between the one or more machine learning models;
    in response to the identification, execute the one or more machine learning models in accordance with the execution sequence using the specific data of the baseline data to identify recommendations for the user that provide an improvement for the user based on the determined event; and
    display the recommendations via a user interface of the software application.

2. The computing system of claim 1, wherein the processor is configured to normalize income data within the ingested data records to remove sensitive details of the plurality of users, and compare the normalized income data to income attributes of the user to identify the recommendations.

3. The computing system of claim 1, wherein the processor is configured to ingest the data records via a plurality of application programming interfaces (APIs) of the plurality of different data sources, respectively.

4. The computing system of claim 1, wherein the processor is configured to fill-in a template on the user interface of the software application with image data of the recommendations for the user.

5. The computing system of claim 1, wherein the processor is further configured to receive an API call, and perform the identification based on one or more model identifiers included in the API call.

6. The computing system of claim 5, wherein the one or more machine learning models comprise an ensemble that includes at least two machine learning models that are executed in sequence to predict a recommended job opportunity for the user.

7. The computing system of claim 5, wherein the processor is further configured to predict, via execution of the one or more machine learning models, a recommended job opportunity for the user based on a geographical location of the user, income data of the user, and a schedule of the user.

8. The computing system of claim 1, wherein the processor is configured to fill in a first field of a template for a job title and a second field of the template for a geographical area based on attributes of the recommendations, and display the identified recommendations via the filled-in template.

9. A method comprising:
    storing baseline data collected from a plurality of different data sources in a storage device, the baseline data comprising baseline employment data of a plurality of users;
    ingesting data records of the plurality of users from the plurality of different data sources;
    determining that an event has occurred for a user from among the plurality of users based on a change to baseline data of the user that is identified from the ingested additional data records;
    identifying, by a machine learning service in response to the determination of the occurrence of the event, an execution sequence of one or more machine learning models of a software application to be executed and specific data of the baseline data to be input into the one or more machine learning models, the execution sequence specifying input and output relationships between the one or more machine learning models;
    in response to the identifying, executing the one or more machine learning models in accordance with the execution sequence using the specific data of the baseline data to identify recommendations for the user that provide an improvement for the user based on the determined event, and
    displaying the recommendations via a user interface of the software application.

10. The method of claim 9, wherein the ingesting further comprises normalizing income data within the ingested data records to remove sensitive details of the plurality of users, and the comparing comprises comparing the normalized income data to income attributes of the user to identify the recommendations.

11. The method of claim 9, wherein the ingesting comprises ingesting the data records via a plurality of application programming interfaces (APIs) of the plurality of different data sources, respectively.

12. The method of claim 9, wherein the displaying comprises filling-in a template on the user interface of the software application with image data of the recommendations for the user.

13. The method of claim 9, wherein the method further comprises receiving an API call, and perform the identification based on one or more model identifiers included in the API call.

14. The method of claim 13, wherein the one or more machine learning models comprise an ensemble that includes at least two machine learning models that are executed in sequence to predict a recommended job opportunity for the user.

15. The method of claim 13, wherein the comparing comprises predicting, via execution of the one or more machine learning models, a recommended job opportunity for the user based on a geographical location of the user, income data of the user, and a schedule of the user.

16. The method of claim 9, wherein the displaying comprises filling in a first field of the template for a job title and a second field of the template for a geographical area based on attributes of the recommendations, and displaying the identified recommendations via the filled-in template.

17. A non-transitory computer-readable medium comprising instructions which when executed by a processor cause a computer to perform a method comprising:

storing baseline data collected from a plurality of different data sources in a storage device, the baseline data comprising baseline employment data of a plurality of users;

ingesting data records of the plurality of users from the plurality of different data sources;

determining that an event has occurred for a user from among the plurality of users based on a change to baseline data of the user that is identified from the ingested additional data records;

identifying, by a machine learning service in response to the determination of the occurrence of the event, an execution sequence of one or more machine learning models of a software application to be executed and specific data of the baseline data to be input into the one or more machine learning models, the execution sequence specifying input and output relationships between the one or more machine learning models;

in response to the identifying, executing the one or more machine learning models in accordance with the execution sequence using the specific data of the baseline data to identify recommendations for the user that provide an improvement for the user based on the determined event, and displaying the recommendations via a user interface of the software application.

18. The non-transitory computer-readable medium of claim 17, wherein the ingesting further comprises normalizing income data within the ingested data records to remove sensitive details of the plurality of users, and the comparing comprises comparing the normalized income data to income attributes of the user to identify the recommendations.

19. The non-transitory computer-readable medium of claim 17, wherein the ingesting comprises ingesting the data records via a plurality of application programming interfaces (APIs) of the plurality of different data sources, respectively.

20. The non-transitory computer-readable medium of claim 17, wherein the displaying comprises filling-in a template on the user interface of the software application with image data of the recommendations for the user.

* * * * *